United States Patent
Honda et al.

(10) Patent No.: US 7,901,807 B2
(45) Date of Patent: Mar. 8, 2011

(54) ENERGY DEVICE AND METHOD FOR PRODUCING THE SAME

(75) Inventors: Kazuyoshi Honda, Takatsuki (JP);
Sadayuki Okazaki, Katano (JP);
Kiichiro Oishi, Kyoto (JP); Makoto Takahashi, Moriguchi (JP); Yoriko Takai, Toyonaka (JP); Junichi Inaba, Toyonaka (JP); Hiroshi Higuchi, Kyotanabe (JP); Shuji Ito, Nara (JP)

(73) Assignee: Panasonic Corporation, Osaka (JP)

( * ) Notice: Subject to any disclaimer, the term of this patent is extended or adjusted under 35 U.S.C. 154(b) by 741 days.

(21) Appl. No.: 10/815,151

(22) Filed: Mar. 31, 2004

(65) Prior Publication Data
US 2004/0197639 A1 Oct. 7, 2004

(30) Foreign Application Priority Data

Apr. 2, 2003 (JP) ................................. 2003-099590

(51) Int. Cl.
*H01M 6/10* (2006.01)
*H01M 10/04* (2006.01)
*H01M 6/46* (2006.01)
(52) U.S. Cl. ............ 429/94; 429/127; 429/124; 429/162
(58) Field of Classification Search .................... 429/94, 429/127, 124, 164, 165, 162
See application file for complete search history.

(56) References Cited

U.S. PATENT DOCUMENTS

| | | | | |
|---|---|---|---|---|
| 4,658,498 | A | * | 4/1987 | Yamaura et al. ............. 29/623.1 |
| 5,445,906 | A | * | 8/1995 | Hobson et al. ................ 429/162 |
| 7,081,142 | B1 | * | 7/2006 | Carlson ........................ 29/623.5 |
| 2003/0134186 | A1 | * | 7/2003 | Shizuki .......................... 429/94 |
| 2003/0186113 | A1 | * | 10/2003 | Hashimoto et al. ............. 429/94 |

FOREIGN PATENT DOCUMENTS

| | | | |
|---|---|---|---|
| JP | 5-43465 | | 6/1993 |
| JP | 9-18030 | | 1/1997 |
| JP | 11-345604 | * | 12/1999 |
| JP | 3088323 | | 6/2002 |

OTHER PUBLICATIONS

Merriam Webster's Collegiate Dictionary, 1998, Merriam-Webster Inc., 10th Ed., p. 891.*
Dictionary.com, definition of plate.*

* cited by examiner

*Primary Examiner* — Dah-Wei Yuan
*Assistant Examiner* — Angela J. Martin
(74) *Attorney, Agent, or Firm* — Hamre, Schumann, Mueller & Larson, P.C.

(57) ABSTRACT

A band-shaped laminate having a flexible elongated substrate, a negative collector, a solid electrolyte, a positive active material, and a positive collector in this order is wound in a plate shape with the flexible elongated substrate placed inside. The band-shaped laminate that is laminated in a particular order is wound with the substrate placed inside, whereby a short-circuit occurrence ratio can be decreased. Furthermore, the band-shaped laminate includes the solid electrolyte, and is wound in a plate shape, whereby the reduction in thickness and the increase in volumetric energy density can be achieved.

4 Claims, 6 Drawing Sheets

ENERGY DEVICE AND METHOD FOR PRODUCING THE SAME

BACKGROUND OF THE INVENTION

1. Field of the Invention

The present invention relates to an energy device and a method for producing the same.

2. Description of the Related Art

A lithium ion secondary battery includes a negative collector, a negative active material, an electrolyte, a separator, a positive active material, and a positive collector as main components. JP 5(1993)-43465 U discloses a lithium secondary battery wound in a spiral shape with a positive electrode placed inside.

In mobile equipment such as a mobile telephone and a personal digital assistant (PDA), there is a demand for a small secondary battery with a large capacity. For this purpose, a secondary battery formed thin in a plate shape is effective. However, the lithium secondary battery disclosed in JP 5(1993)-43465 U is a liquid-type secondary battery having a cylindrical shape, in which a spiral winding body is soaked in an electrolyte solution. Therefore, there is a limit to the miniaturization and the reduction in thickness of the liquid-type secondary battery due to its configuration.

Currently, the reduction in thickness and the increase in volumetric energy density (energy capacity per volume) of a lithium secondary battery are proceeding, and a lithium secondary battery with a thinner collector and a thinner active material, using a solid electrolyte, has been studied. According to this, it is expected that a high volumetric energy density is obtained even with a small thickness, and a separator is not required.

However, an energy element such as a lithium ion secondary battery requires several considerations and ideas for preventing a short-circuit. In the case where an energy element is made thinner, positive and negative electrodes are positioned close to each other, so that further considerations are required. For example, when a sheet-shaped energy element is wound in a plate shape for the purpose of the reduction in thickness and the increase in volumetric energy density, there is a possibility that a short-circuit may occur at a bent portion. Thus, some measures are required.

Therefore, with the foregoing in mind, it is an object of the present invention to provide a thin energy device with a large capacity having a low short-circuit occurrence ratio and a method for producing the same.

SUMMARY OF THE INVENTION

In order to achieve the above-mentioned object, a first energy device of the present invention includes a winding body in which a band-shaped laminate having a flexible elongated substrate, a negative collector, a solid electrolyte, a positive active material, and a positive collector in this order is wound in a plate shape with the flexible elongated substrate placed inside.

Furthermore, a second energy device of the present invention includes a winding body in which a band-shaped laminate having a flexible elongated substrate, a negative collector, a solid electrolyte, a positive active material, and a positive collector in this order is wound in a plate shape with the flexible elongated substrate placed inside, and an inner core placed in a winding core portion of the winding body.

Furthermore, a first method for producing an energy device of the present invention includes: laminating a negative collector, a solid electrolyte, a positive active material, and a positive collector in this order on a flexible elongated substrate to obtain a band-shaped laminate; and winding the band-shaped laminate in a plate shape with the flexible elongated substrate placed inside.

Furthermore, a second method for producing an energy device of the present invention includes: laminating a negative collector, a solid electrolyte, a positive active material, and a positive collector in this order on a flexible elongated substrate to obtain a band-shaped laminate; winding the band-shaped laminate in a substantially cylindrical shape with the flexible elongated substrate placed inside to obtain a winding body; and pressing the winding body wound in a substantially cylindrical shape to obtain a plate-shaped winding body.

These and other advantages of the present invention will become apparent to those skilled in the art upon reading and understanding the following detailed description with reference to the accompanying figures.

DESCRIPTION OF THE PREFERRED EMBODIMENTS

An energy device of the present invention includes a winding body in which a band-shaped laminate having a flexible elongated substrate, a negative collector, a solid electrolyte, a positive active material, and a positive collector in this order is wound in a plate shape with the flexible elongated substrate placed inside. The band-shaped laminate that is laminated in a particular order is wound with a substrate placed inside, whereby a short-circuit occurrence ratio can be decreased. Furthermore, the band-shaped laminate includes a solid electrolyte, and is wound in a plate shape, whereby both the reduction in thickness and the increase in volumetric energy density can be achieved. As a result of the above, a thin energy device with a large capacity having a low short-circuit occurrence ratio can be obtained.

Furthermore, a method for producing an energy device of the present invention includes laminating a negative collector, a solid electrolyte, a positive active material, and a positive collector in this order on a flexible elongated substrate to obtain a band-shaped laminate. Subsequent to this, a first production method includes winding the band-shaped laminate in a plate shape with the flexible elongated substrate placed inside. Furthermore, a second production method includes winding the band-shaped laminate in a substantially cylindrical shape with the flexible elongated substrate placed inside to obtain a winding body, and pressing the winding body wound in a substantially cylindrical shape to flatten it. Each layer is laminated on the flexible elongated substrate in a particular order to obtain a band-shaped laminate, and thereafter, the band-shaped laminate is wound with the substrate placed inside, whereby a short-circuit occurrence ratio can be decreased. Furthermore, the band-shaped laminate includes a solid electrolyte, and is wound in a plate shape, whereby both the reduction in thickness and the increase in volumetric energy density can be achieved. As a result of the above, a thin energy device with a large capacity having a low short-circuit occurrence ratio can be obtained.

Hereinafter, the present invention will be described by way of embodiments with reference to the drawings.

Embodiment 1

Figure 1:
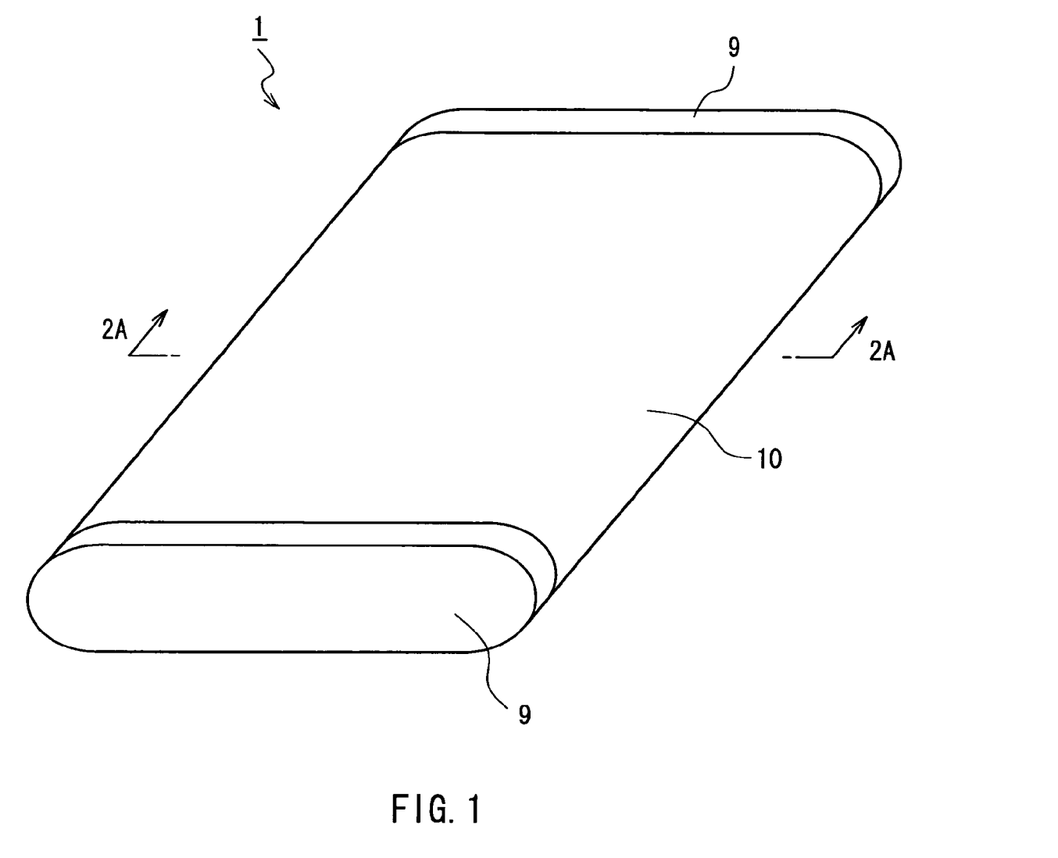
FIG. 1 is a perspective view showing a schematic configuration of an energy device according to Embodiment 1 of the present invention.
Figure 2A:
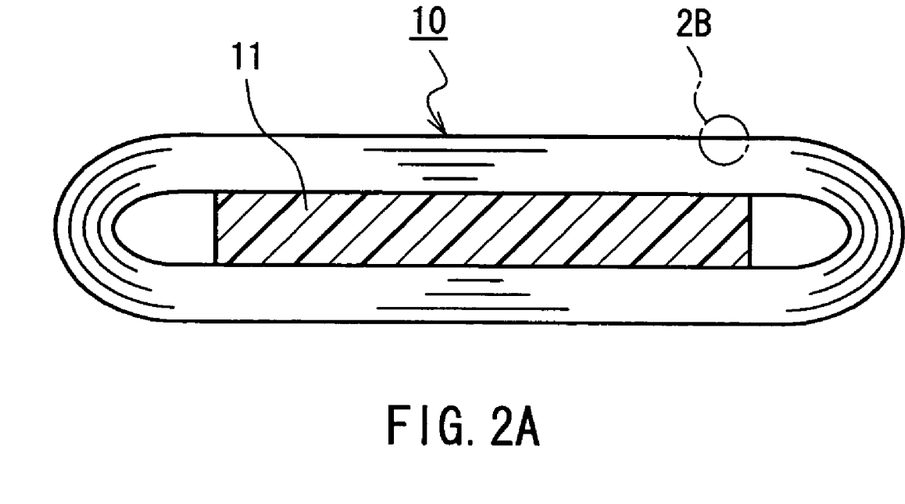
FIG. 2A is a cross-sectional view taken along a line 2A-2A in FIG. 1.

An exemplary configuration of an energy device of the present invention will be described. FIG. 1 is a perspective view showing a schematic configuration of an energy device 1 according to Embodiment 1 of the present invention. FIG. 2A is a cross-sectional view taken along a line 2A-2A in FIG. 1, and FIG. 2B is an enlarged cross-sectional view of a portion 2B in FIG. 2A.

As shown in FIG. 1, the energy device 1 of the present embodiment includes a plate-shaped winding body 10, and a pair of external electrodes 9, 9 provided at both ends of the winding body 10.

Figure 2B:
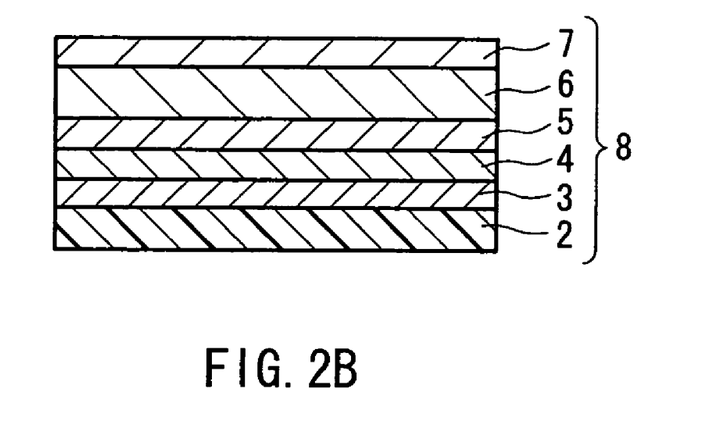
FIG. 2B is an enlarged cross-sectional view of a portion 2B in FIG. 2A.

As shown in FIGS. 2A and 2B, the plate-shaped winding body 10 is configured in such a manner that a band-shaped laminate 8, in which a negative collector 3, a negative active material 4, a solid electrolyte 5, a positive active material 6, and a positive collector 7 are formed in this order on a flexible elongated substrate 2, is wound in a plate shape with the substrate 2 placed inside.

As the flexible elongated substrate 2, a film or a sheet made of polyimide (PI), polyamide (PA), polyethylene naphthalate (PEN), polyethylene terephthalate (PET), or other polymer resins; a stainless metal foil; a metal foil containing nickel, copper, aluminum, or other metal elements; or the like can be used. It is preferable that the substrate 2 has isolation. In this configuration, when a pair of external electrodes 9, 9 are formed at both ends of the plate-shaped winding body 10 as shown in FIG. 1, the isolation of the external electrodes 9, 9 can be maintained easily.

As the negative collector 3, a layer containing metal such as nickel, copper, aluminum, platinum, platinum-palladium, gold, silver, or indium-tin oxide (ITO) can be used.

As the negative active material 4, a carbon material such as graphite; silicon, or a compound containing silicon or a mixture thereof lithium or a lithium compound such as lithium-aluminum; or the like can be used. The material for the negative active material 4 according to the present invention is not limited to the above, and other materials also may be used for the negative active material 4. The negative active material 4 may be formed using the movement of lithium ions contained in the positive active material 6 (described later). In this case, it is possible to omit the negative active material 4 in an initial stage of forming an energy device.

As the solid electrolyte 5, a material having ion conductivity and negligibly small electron conductivity can be used. Particularly, in the case of using the energy device 1 as a lithium ion secondary battery, since lithium ions are mobile ions, a solid electrolyte made of $Li_3PO_4$ or a material (LiPON: a typical composition is $Li_{2.9}PO_{3.3}N_{0.36}$) obtained by mixing nitrogen with $Li_3PO_4$ (or by substituting nitrogen for a part of the elements of $Li_3PO_4$) is preferable due to its excellent lithium ion conductivity. Similarly, solid electrolytes made of sulfides such as $Li_2S$—$SiS_2$, $Li_2S$—$P_2S_5$, and $Li_2S$—$B_2S_3$ also are effective. Furthermore, solid electrolytes obtained by doping the above-mentioned solid electrolytes with lithium halide such as LiI or a lithium oxysalt such as $Li_3PO_4$ also are effective. The material for the solid electrolyte 5 according to the present invention is not limited to the above, and other materials also can be used as the solid electrolyte 5.

As the positive active material 6, lithium cobaltate, lithium nickelate, or the like can be used. The positive active material 6 according to the present invention is not limited to the above materials, and other materials also can be used as the positive active material 6.

As the positive collector 7, in the same way as in the negative collector 3, a layer containing metal such as nickel, copper, aluminum, platinum, platinum-palladium, gold, silver, or ITO can be used.

An inner core 11 to be placed in a winding core portion of the winding body 10 preferably has a plate shape. Although there is no particular limit to the material for the inner core 11, resin, ceramic, metal, or the like can be used. Particularly, it is preferable that the inner core 11 is made of an insulating material. This is because, when a pair of the external electrodes 9, 9 are formed at both ends of the inner core 11 as shown in FIG. 1, the isolation between the external electrodes 9, 9 is maintained easily. The inner core 11 may not be required.

In the energy device 1 of the present invention, the negative collector 3, the negative active material 4, the solid electrolyte 5, the positive active material 6, and the positive collector 7 are formed in this order on the substrate 2. The band-shaped laminate 8 thus formed is wound in a plate shape with the substrate 2 placed inside. The reason for placing the negative collector 3 of a multi-layered laminate having the negative collector 3, the negative active material 4, the solid electrolyte 5, the positive active material 6, and the positive collector 7 on the substrate 2 side, and the reason for winding the band-shaped laminate 8 with the substrate 2 placed inside are as follows. In the case of winding the band-shaped laminate 8 in a plate shape, in the right and left end portions in FIG. 2A, the radius of curvature is small, and in the right and left end portions, the radius of curvature further is decreased particularly toward an inner layer side. Thus, a larger bending stress is applied to the inner layer side. In general, when a crack is formed in a lower layer of the multi-layered laminate, the crack is likely to be transmitted to an upper layer to cause a short-circuit between layers. On the other hand, even when a crack is formed in the upper layer, the crack tends not to be transmitted to the lower layer. Thus, by placing a layer having relative ductility and flexibility on the inner layer side having a small radius of curvature, and placing a layer that is brittle and likely to be cracked relatively on an outer layer side having a large radius of curvature, a layer crack is prevented from being enlarged to cause a short-circuit between layers. According to the present invention, the band-shaped laminate 8 is wound in such a manner that the substrate 2 having flexibility is placed on an innermost layer side, and the negative active material 4 having flexibility relative to the positive active material 6 is placed on the inner layer side with respect to the positive active material 6.

It is preferable that the thickness of the negative active material 4 is smaller than that of the positive active material 6. The layer thickness of the negative active material 4 that is bent at a small radius of curvature by being placed relatively on the inner layer side is set to be smaller than that of the positive active material 6 that is bent at a large radius of curvature by being placed on the outer layer side with respect to the negative active material 4, whereby the chances of the negative active material 4 being cracked can be reduced, and a short-circuit occurrence ratio is decreased.

In the winding body 10, it is preferable that a sum R1 of a half of the thickness of the inner core 11 and the thickness of the substrate 2 is 5 times to 100 times the total thickness of the negative collector 3, the negative active material 4 (only when it is present), the solid electrolyte 5, the positive active material 6, and the positive collector 7. When the sum R1 of the thickness is smaller than this range, the negative collector 3 is likely to be cracked, and a short-circuit occurrence ratio is increased. When the sum R1 of the thickness is larger than this range, the thickness of the energy device 1 is increased, whereby a volumetric energy density is decreased.

In the absence of the inner core 11, it is preferable that a minimum radius of curvature R2 of an outer surface (which is matched with an inner surface of the negative collector 3 on an innermost side) of the substrate 2 on the innermost layer side is 5 times to 100 times the total thickness of the negative collector 3, the negative active material 4 (only when it is present), the solid electrolyte 5, the positive active material 6, and the positive collector 7. When the minimum radius of curvature R2 is smaller than this range, the negative collector 3 is likely to be cracked, and a short-circuit occurrence ratio is increased. When the minimum radius of curvature R2 is larger than this range, the thickness of the energy device 1 is increased, whereby a volumetric energy density is decreased.

In the present invention, the winding body 10 being in a "plate shape" means that the size in a horizontal direction is larger than that in a vertical direction in a cross-sectional shape shown in FIG. 2A. More specifically, the ratio of the size in the horizontal direction to the size in the vertical direction preferably is at least 5, and more preferably is at least 10. As this ratio is larger, it becomes easier to make equipment, on which the energy device 1 is mounted, thinner. It is preferable that the upper and lower surfaces of the winding body 10 are flat as shown in FIG. 2A. The present invention is not limited thereto. For example, the upper and lower surfaces may be substantially cylindrical surfaces that project respectively in the vertical direction.

Although the number of winding of the band-shaped laminate 8 in the winding body 10 is not particularly limited, it preferably is 1 to 300 turns, and more preferably is 5 to 150 turns. As the number of winding is larger, the battery capacity of the energy device 1 is increased; however, it becomes difficult to obtain a thin plate-shaped winding body.

As the material for a pair of the external electrodes 9, 9 provided at both ends of the winding body 10, various kinds of conductive materials such as nickel, zinc, tin, a solder alloy, a conductive resin, or the like can be used. As the method for forming the external electrodes 9, 9, thermal spraying, plating, coating, or the like can be used. The negative collector 3 is connected electrically to one external electrode 9, and the positive collector 7 is connected electrically to the other external electrode 9. In addition, regions where the negative collector 3 and the positive collector 7 are formed are patterned in a width direction (winding central axis direction) so that the pair of external electrodes 9, 9 are insulated from each other. This prevents the negative collector 3 and the positive collector 7 from being short-circuited via either one of the external electrodes 9, 9.

As described above, a thin energy device can be obtained.

There is no particular limit to the size of the energy device 1. However, it is preferable that the size in the horizontal direction in FIG. 2A and the size in a direction vertical to the drawing surface of FIG. 2A (size in a winding axis direction) are 3 mm or more (in particular, 5 mm or more) and 1000 mm or less (in particular, 300 mm or less). When these sizes are smaller than these ranges, a plate-shaped winding body is unlikely to be obtained, and a short-circuit occurrence ratio is increased. Furthermore, when these sizes are larger than these ranges, the volume of the energy device 1 is increased. Furthermore, the size in the horizontal direction of the energy device 1 may be the same or different from the size in the winding axis direction of the energy device 1.

Although there is no particular limit to a volumetric capacity density of the energy device 1, a range of 100 Wh/L to 1000 Wh/L is preferable.

Embodiment 2

An exemplary method for producing an energy device 1 of the present invention will be described.

A method for producing an energy device 1 of the present embodiment includes laminating a negative collector 3, a negative active material 4 (which can be omitted), a solid electrolyte 5, a positive active material 6, and a positive collector 7 in this order on a flexible elongated substrate 2 to obtain a band-shaped laminate 8 (thin film lamination step), and winding the band-shaped laminate thus obtained in a plate shape with the flexible elongated substrate placed inside (winding step).

Figure 3:
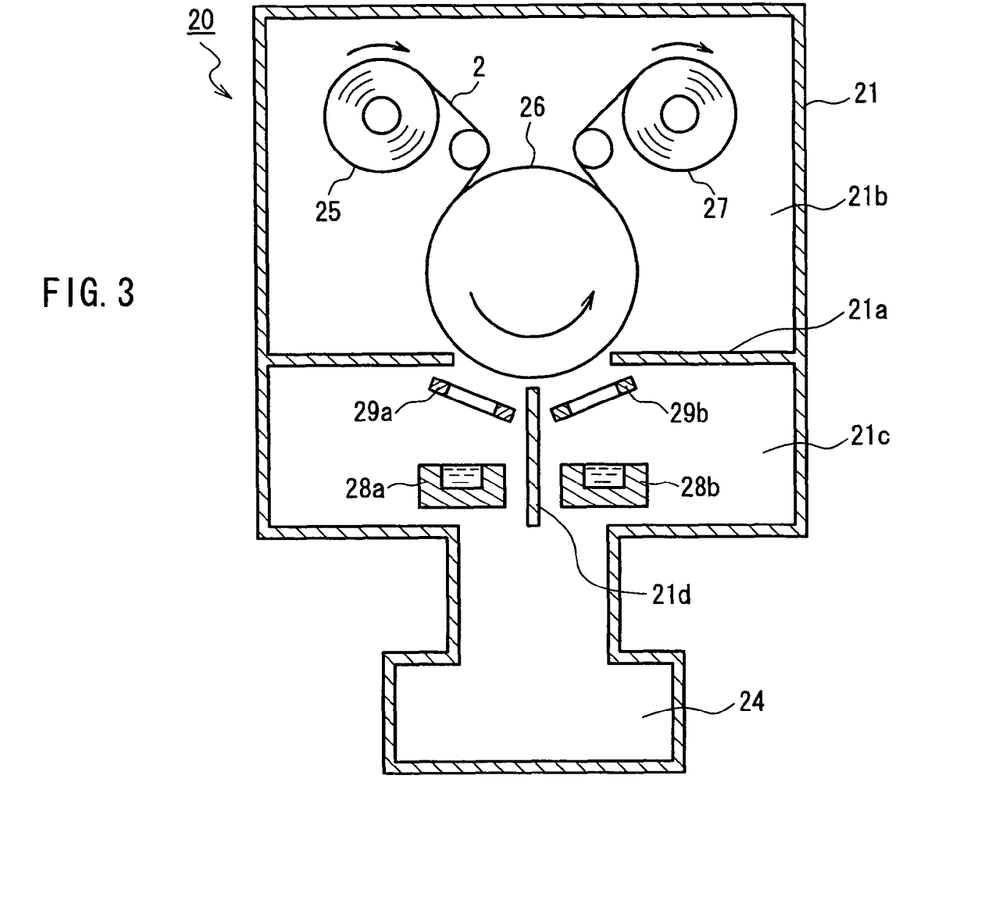
FIG. 3 is a side cross-sectional view showing an exemplary schematic configuration of a vacuum film-forming apparatus for performing a thin film lamination step in a method for producing an energy device according to Embodiment 2 of the present invention.
Figure 4:
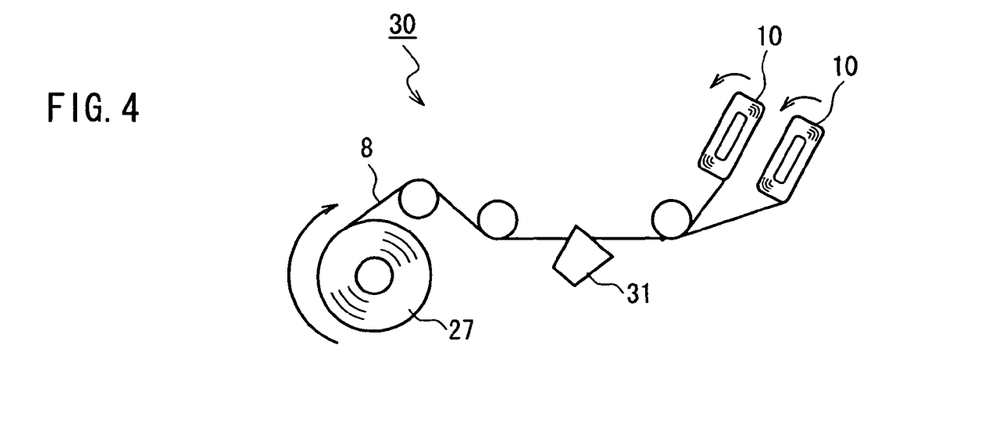
FIG. 4 is a side view showing an exemplary schematic configuration of a take-up apparatus for performing a winding step in the method for producing an energy device according to Embodiment 2 of the present invention.

FIG. 3 is a side cross-sectional view showing an exemplary schematic configuration of a vacuum film-forming apparatus for performing the thin film lamination step, and FIG. 4 is a side view showing an exemplary schematic configuration of a take-up apparatus for performing the winding step.

The vacuum film-forming apparatus 20 shown in FIG. 3 has a vacuum tank 21 partitioned into upper and lower parts by a partition wall 21a. In an upper chamber (transporting chamber) 21b on an upper side of the partition wall 21a, an unwinding roll 25, a transporting roll 26, and a bobbin 27 are placed. In a lower chamber (thin film forming chamber) 21c on a lower side of the partition wall 21a, a first thin film forming source 28a and a second thin film forming source 28b, and a first pattern mask 29a and a second pattern mask 29b are placed respectively with a partition wall 21d placed therebetween. In a central portion of the partition wall 21a, there is an opening, whereby a lower surface of the transporting roll 26 is exposed to the thin film-forming chamber 21c side. The inside of the vacuum tank 21 is kept at a predetermined vacuum degree by a vacuum pump 24.

The elongated substrate 2 unwound from the unwinding roll 25 is transported along the transporting roll 26, and passes across the opening of the partition wall 21a. At this time, the first thin film forming source 28a and the second thin film forming source 28b successively form thin films on the surface of the substrate 2. The substrate 2 with the thin films formed thereon is taken up around the bobbin 27.

As the method for forming thin films by the first thin film forming source 28a and the second thin film forming source 28b, various kinds of vacuum film-forming methods, such as vapor deposition, sputtering, ion plating, laser abrasion, or the like, can be used depending upon the kind of thin films. According to such a method, desired thin films can be formed easily in an efficient manner.

The apparatus shown in FIG. 3 has the first thin film forming source 28a and the second thin film forming source 28b. Therefore, while the substrate 2 is unwound from the unwinding roll 25 and is taken up around the bobbin 27, a two-layered thin film can be formed at a time over the transporting roll 26. By repeating a series of steps including unwinding of the substrate 2, thin film formation, and take-up of the substrate 2 by a required number of times, using the apparatus shown in FIG. 3, the band-shaped laminate 8 as shown in FIG. 2B can be obtained. Although the apparatus shown in FIG. 3 can form a two-layered thin film by allowing the substrate 2 to run once, the present invention is not limited thereto. For example, the band-shaped laminate 8 as shown in FIG. 2B may be obtained by allowing the substrate 2 to run repeatedly for the number of layers, using an apparatus having only one thin film-forming source, or merely by allowing the substrate 2 to run once, using an apparatus in which thin film forming sources are placed successively for the number of kinds of thin films.

A pair of external electrodes 9, 9 to be attached to both ends in a width direction of the plate-shaped winding body 10 (formed later) are connected electrically to the negative collector 3 and the positive collector 7, respectively. At this time, it is necessary that the negative collector 3 and the positive collector 7 are not connected to the same external electrode. This makes it necessary to adjust a film-forming position during film formation, and as means for realizing this, in the present embodiment, the first pattern mask 29a and the second pattern mask 29b are used. The first pattern mask 29a and the second pattern mask 29b are provided with a slit-shaped opening in a movement direction of the substrate 2. A thin film is formed only in a region of the substrate 2 opposed to the opening, so that a thin film pattern in a stripe shape in a longitudinal direction of the substrate 2 can be obtained easily. By changing the position and width of the openings of the pattern masks 29a and 29b in accordance with a layer to be formed, a lamination pattern required for configuring the energy device 1 can be obtained. Furthermore, by providing multiple slit-shaped openings in the first pattern mask 29a and the second pattern mask 29b, a plurality of energy devices can be produced in a width direction, using the thin film laminate 8 taken up around the bobbin 27.

By using the vacuum film-forming apparatus 20, the band-shaped laminate 8 in which the negative collector 3, the negative active material 4 (which can be omitted), the solid electrolyte 5, the positive active material 6, and the positive collector 7 are laminated in this order on the flexible elongated substrate 2 is taken up around the bobbin 27.

The band-shaped laminate 8 on the bobbin 27 is unwound, and then, is taken up around the flat-shaped winding body 10 so that the substrate 2 is placed inside, in a take-up apparatus 30 shown in FIG. 4. By exchanging the winding body 10 at a time when the taken-up length of the winding body 10 reaches a predetermined value, a plurality of winding bodies 10 can be obtained in the longitudinal direction of the band-shaped laminate 8 on the bobbin 27. Furthermore, the band-shaped laminate 8 that has been unwound is divided into a plurality of rows in a width direction by a cutting apparatus 31 such as a razor blade, or the like, and each row is taken up around the winding body 10, whereby a plurality of winding bodies 10 can be obtained in the width direction of the band-shaped laminate 8 on the bobbin 27. In FIG. 4, although cutting in the width direction is performed in a stage after the band-shaped laminate 8 is unwound from the bobbin 27, and before it is taken up around the winding body 10, the present invention is not limited thereto. For example, the band-shaped laminate 8 may be cut in a width direction when on the bobbin 27 or when being taken up around the winding body 10.

A method for taking up the band-shaped laminate 8 around the plate-shaped winding body 10 is not particularly limited. For example, a method for taking up the band-shaped laminate 8 around an outer periphery of a plate-shaped inner core, a method for taking up the band-shaped laminate 8 so that it extends across a pair of pillars parallel to each other, and the like can be used.

The winding body 10 taken up in a plate shape may be pressed by heating, if required, to reduce the thickness thereof and to further flatten front and back surfaces thereof. Pressing with heating can be performed, using a press apparatus shown in FIG. 7 (described later). At this time, it is preferable that the winding body 10 is pressed with the plate-shaped inner core 11 placed in the winding core portion of the winding body 10. This is because the shape and thickness after pressing can be stabilized, and furthermore, a crack of a thin film can be suppressed. The inner core 11 may be removed after pressing.

The external electrodes 9, 9 may be formed at both ends in a width direction of the plate-shaped winding body 10 thus obtained. By forming the external electrodes 9, 9, the winding body 10 can be incorporated into various kinds of electronic equipment and wired easily. As the material for the external electrodes 9, 9, various kinds of conductive materials such as nickel, zinc, tin, a solder alloy, and a conductive resin can be used. Furthermore, as the method for forming the external electrodes 9, 9, thermal spraying, plating, coating, or the like can be used. According to these methods, external electrodes can be formed efficiently.

As a result of the above, the energy device 1 shown in FIG. 1 can be obtained.

Embodiment 3

Another example of a method for producing an energy device 1 of the present invention will be described.

A method for producing an energy device 1 of the present embodiment includes laminating a negative collector 3, a negative active material 4 (which can be omitted), a solid electrolyte 5, a positive active material 6, and a positive collector 7 in this order on a flexible elongated substrate 2 to obtain a band-shaped laminate 8 (thin film lamination step); winding the band-shaped laminate thus obtained in a substantially cylindrical shape with the flexible elongated substrate placed inside to obtain a winding body (winding step); and pressing the winding body wound in a substantially cylindrical shape to flatten it (pressing step).

Figure 5:
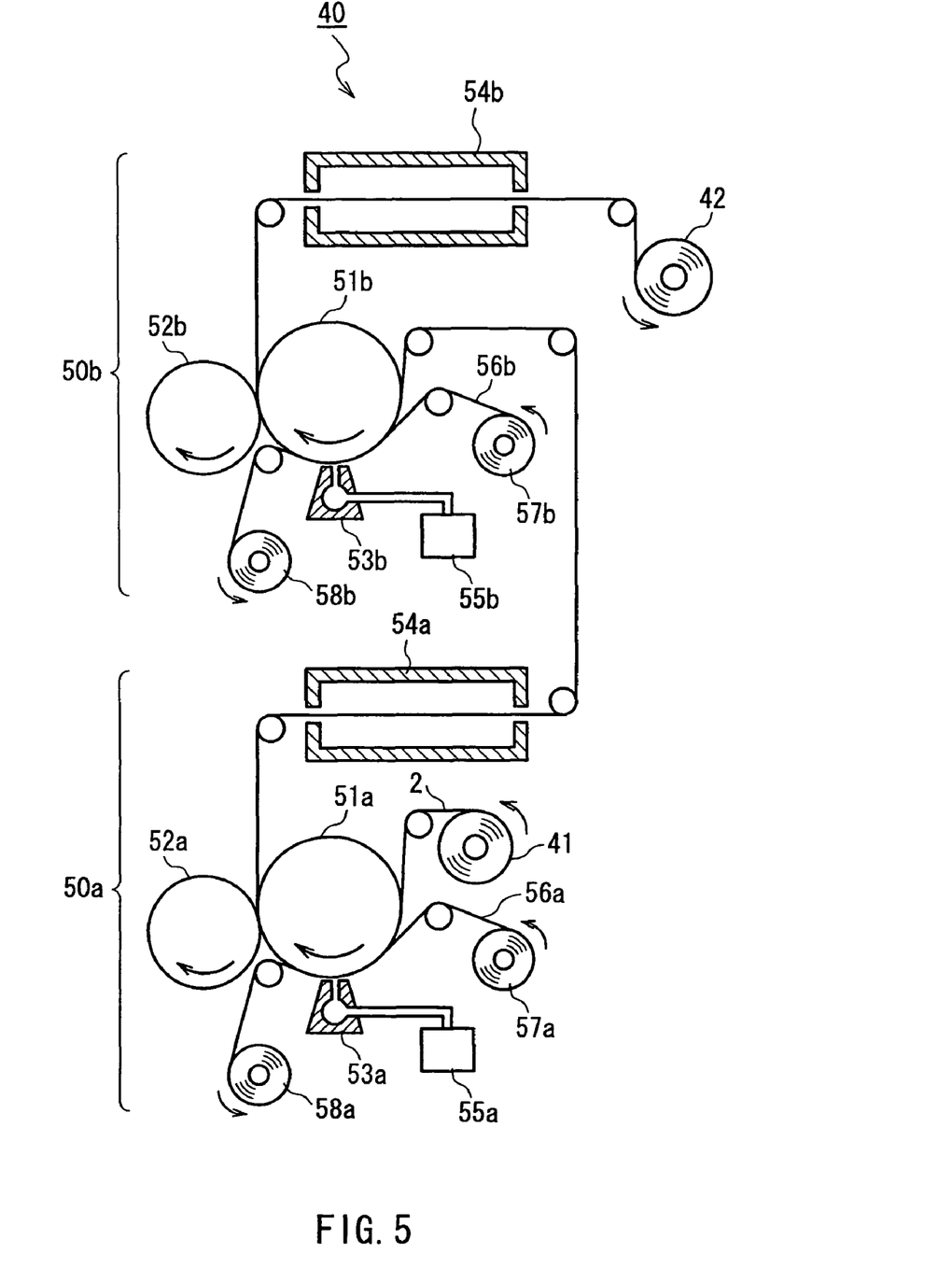
FIG. 5 is a side cross-sectional view showing an exemplary schematic configuration of a wet coating apparatus for performing a thin film lamination step in a method for producing an energy device according to Embodiment 3 of the present invention.
Figure 6:
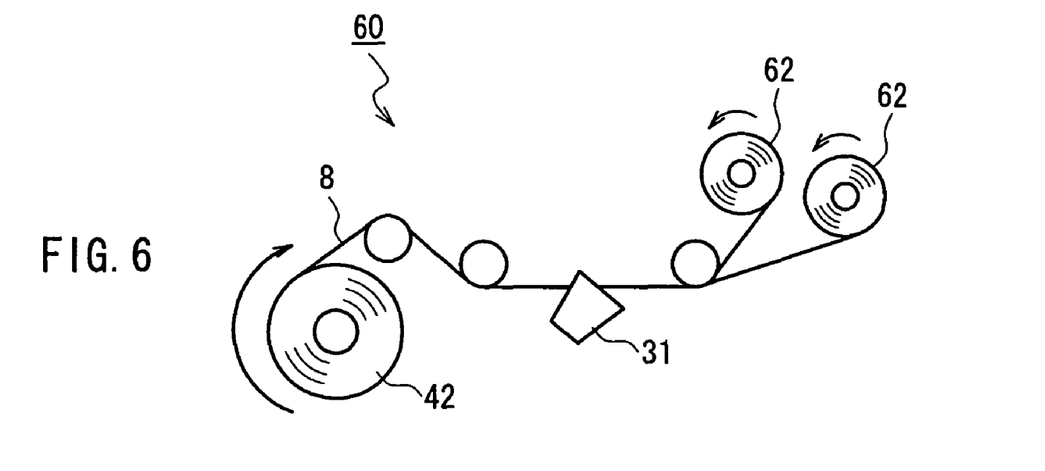
FIG. 6 is a side view showing an exemplary schematic configuration of a take-up apparatus for performing a winding step in the method for producing an energy device according to Embodiment 3 of the present invention.
Figure 7:
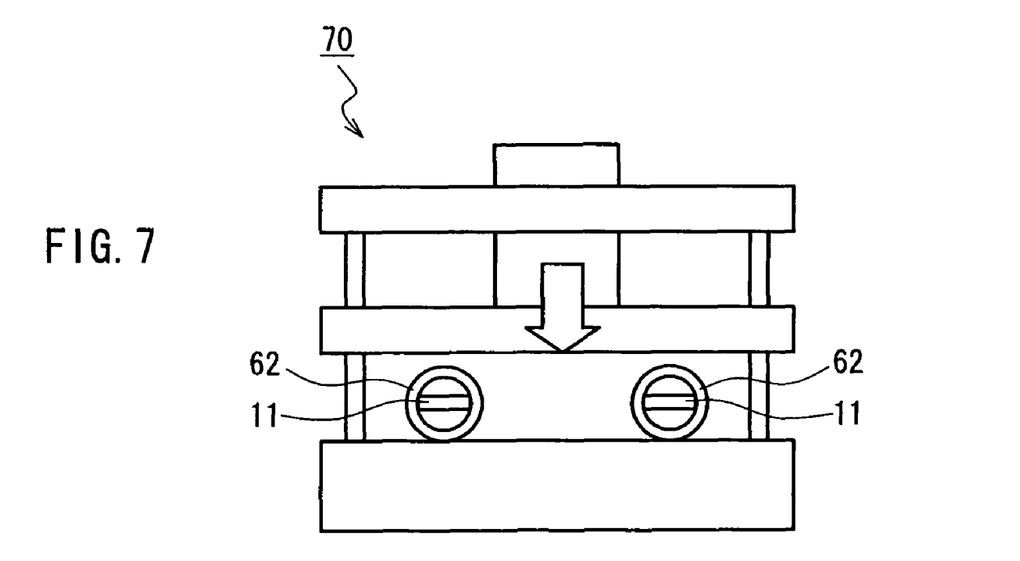
FIG. 7 is a side view showing an exemplary schematic configuration of a press apparatus for performing a pressing step of pressing a winding body to flatten it in the method for producing an energy device according to Embodiment 3 of the present invention.

FIG. 5 is a side cross-sectional view showing an exemplary schematic configuration of a wet coating apparatus for performing the thin film lamination step. FIG. 6 is a side view showing an exemplary schematic configuration of a take-up apparatus for performing the winding step. FIG. 7 is a side view showing an exemplary schematic configuration of a press apparatus for performing the pressing step of pressing a winding body to flatten it.

In a wet coating apparatus 40 shown in FIG. 5, a first coating portion 50a and a second coating portion 50b form thin films successively on one surface of the elongated substrate 2 unwound from an unwinding roll 41, and thereafter, the elongated substrate 2 is taken up around a bobbin 42.

The configuration of the first coating portion 50a is the same as that of the second coating portion 50b. Therefore, both of them will be described simultaneously. While the substrate 2 is transported along transporting rolls 51a, 51b, the substrate 2 is coated with a liquid film material discharged from fountains 53a, 53b placed below the transporting rolls 51a, 51b. An excess film material adhering to one surface of the substrate 2 is scraped off by reverse rolls 52a and 52b, whereby the adhered thickness can be made uniform. Thereafter, the substrate 2 is transported to heating apparatuses 54a, 54b, and the film material is heated and solidified to be a film. Reference numerals 55a, 55b denote material supply portions for storing a liquid film material and supplying it to the fountains 53a, 53b.

As the coating method, various kinds of wet coating methods such as gravure coating, reverse coating, spray coating, screen coating, offset coating, or the like can be used. According to such a method, a desired film can be formed easily in an efficient manner.

The apparatus shown in FIG. 5 includes the first coating portion 50a and the second coating portion 50b. Therefore, while the substrate 2 is unwound from the unwinding roll 41 and taken up around the bobbin 42, a two-layered thin film can be formed at a time. By repeating a series of steps including unwinding of the substrate 2, thin film formation, and take-up of the substrate 2 by a required number of times, using this apparatus, a band-shaped laminate 8 as shown in FIG. 2B can be obtained. Although the apparatus shown in FIG. 5 can form a two-layered thin film by allowing the substrate 2 to run once, the present invention is not limited thereto. For example, the band-shaped laminate 8 as shown in FIG. 2B may be obtained by allowing the substrate 2 to run repeatedly for the number of layers, using an apparatus having only one coating portion, or by allowing the substrate 2 to run once, using an apparatus in which coating portions are placed successively for the number of kinds of thin films.

A pair of external electrodes 9, 9 to be attached to both ends in a width direction of a plate-shaped winding body 10 (formed later) are connected electrically to the negative collector 3 and the positive collector 7, respectively. At this time, it is required that the negative collector 3 and the positive collector 7 are not connected to the same external electrode. This makes it necessary to adjust the film-forming position during film formation, and as means for realizing this, a masking apparatus is required. In the present example, masking tapes 56a, 56b are used. The masking tapes 56a, 56b are elongated tapes having a width corresponding to a region where film formation is not required. The masking tapes 56a, 56b are unwound from unwinding rolls 57a, 57b, and transported together with the substrate 2 in contact with the surface of the substrate 2 on the fountains 53a, 53b side over the transporting rolls 51a, 51b. Thereafter, the masking tapes 56a, 56b are separated from the substrate 2 and taken up around take-up rolls 58a, 58b. A film material, which adheres to the masking tapes 56a, 56b while the masking tapes 56a, 56b pass over the fountains 53a, 53b, is removed from the substrate 2 together with the masking tapes 56a, 56b. Thus, a film is formed only in a region where the masking tapes 56a, 56b have not intervened. Therefore, a thin film pattern in a stripe shape can be obtained easily in a longitudinal direction of the substrate 2. By changing the position and width of the masking tapes 56a, 56b in accordance with a layer to be formed, a lamination pattern required for configuring the energy device 1 can be obtained. Furthermore, by setting the masking tapes 56a, 56b to be a number of rows, a plurality of energy devices can be produced in a width direction, using the thin film laminate 8 taken up around the bobbin 27. The masking method is not limited to that using the masking tapes 56a, 56b shown in FIG. 5. Instead of using the masking tapes, by patterning an engraving position of a gravure roll in the case of gravure coating; by patterning a screen position in the case of screen coating; and by using an adhesion preventing mask pattern in the case of spray coating, a desired thin film pattern can be obtained.

By using the above-mentioned wet coating apparatus 40, the band-shaped laminate 8, in which the negative collector 3, the negative active material 4 (which can be omitted), the solid electrolyte 5, the positive active material 6, and the positive collector 7 are laminated in this order on the flexible elongated substrate 2, is taken up around the bobbin 42.

The band-shaped laminate 8 on the bobbin 42 is unwound, and then, is taken up around a winding body 62 in a substantially cylindrical shape so that the substrate 2 is placed inside, in a take-up apparatus 60 shown in FIG. 6. By exchanging the winding body 62 at a time when the taken-up length of the winding body 62 reaches a predetermined value, a plurality of the winding bodies 62 can be obtained in a longitudinal direction of the band-shaped laminate 8 on the bobbin 42. Furthermore, by dividing the unwound band-shaped laminate 8 into a plurality of rows in a width direction with a cutting apparatus 31 such as a razor blade or the like and taking up the respective rows around the winding body 62, a plurality of winding bodies 62 can be obtained in a width direction of the band-shaped laminate 8 on the bobbin 42. In FIG. 6, although cutting in a width direction is performed in a stage after the band-shaped laminate 8 is unwound from the bobbin 42 and before the band-shaped laminate 8 is taken up around the winding body 62, the present invention is not limited thereto. For example, the band-shaped laminate 8 may be cut in a width direction when on the bobbin 42 or when being taken up around the winding body 62.

The winding body 62 in a substantially cylindrical shape is pressed by heating in a press apparatus 70 shown in FIG. 7, whereby a plate-shaped winding body 10 is obtained. At this time, it is preferable that the winding body 62 in a substantially cylindrical shape is pressed with a plate-shaped inner core 11 placed in the winding core portion of the winding body 62. This is because the shape and thickness after pressing can be stabilized, and furthermore, cracking of a thin film can be suppressed. The inner core 11 may be removed after pressing.

The external electrodes 9, 9 may be formed at both ends in a width direction of the plate-shaped winding body 10 thus obtained. By forming the external electrodes 9, 9, the resultant winding body 10 can be incorporated into various kinds of electronic equipment and wired easily. As the material for the external electrodes 9, 9, various kinds of conductive materials such as nickel, zinc, tin, a solder alloy, a conductive resin, or the like can be used. Furthermore, as the method for forming the external electrodes 9, 9, thermal spraying, plating, coating, or the like can be used. According to these methods, external electrodes can be formed efficiently.

As a result of the above, the energy device 1 shown in FIG. 1 can be obtained.

The method for producing the energy device 1 of the present invention is not limited to those described in Embodiments 2 and 3. For example, the following may be possible: the thin film lamination step is performed by the vacuum film-forming method (FIG. 3) described in Embodiment 2, and thereafter, the winding step (FIG. 6) and the pressing step (FIG. 7) described in Embodiment 3 are performed. Alternatively, the following also may be possible: the thin film lamination step is performed by the wet coating method (FIG. 5)

described in Embodiment 3, and thereafter, the winding step (FIG. 4) described in Embodiment 2 is performed.

EXAMPLES

Examples 1-5

The energy devices described in Embodiment 1 of the present invention were produced by performing the vacuum film-forming method (FIG. 3) described in Embodiment 2, and thereafter, performing the winding step (FIG. 6) and the pressing step (FIG. 7) described in Embodiment 3.

Nickel (thickness: 0.5 µm) as a negative collector 3, lithium-aluminum (thickness: 0.4 µm) as a negative active material 4, a lithium-phosphorus-oxygen material (thickness: 1 µm) as a solid electrolyte 5, lithium cobaltate (thickness: 4 µm) as a positive active material 6, and nickel (thickness: 0.4 µm) as a positive collector 7 were formed into thin films successively by vapor deposition on a polyimide film (thickness: 10 µm) as a flexible elongated substrate 2, whereby a band-shaped laminate 8 was obtained. By performing vapor deposition via a pattern mask provided with predetermined openings, the position and width of a stripe-shaped region with no thin film formed therein continuous in a longitudinal direction were set appropriately.

The band-shaped laminate 8 thus obtained was unwound, and then, was taken up around a winding body 62 in a substantially cylindrical shape so that the substrate 2 was placed inside, in a take-up apparatus 60 shown in FIG. 6.

Then, the winding body 62 in a substantially cylindrical shape was pressed by heating in a press apparatus 70 shown in FIG. 7 to obtain a plate-shaped winding body 10. The winding body 10 was subjected to pressure forming at 150° C. and 78.5 kPa under the condition that an inner core 11 in a plate shape was placed in a winding core portion of the winding body 62. A polyimide plate was used as the inner core 11, and its thickness was set to be in the following five values: 0 µm (without an inner core), 10 µm, 40 µm, 1300 µm, and 3000 µm (assumed to be Examples 1, 2, 3, 4, and 5 in this order).

External electrodes were formed at both ends of the plate-shaped winding body 10 thus obtained by thermal spraying of nickel.

Comparative Examples 1-5

Figure 8A:
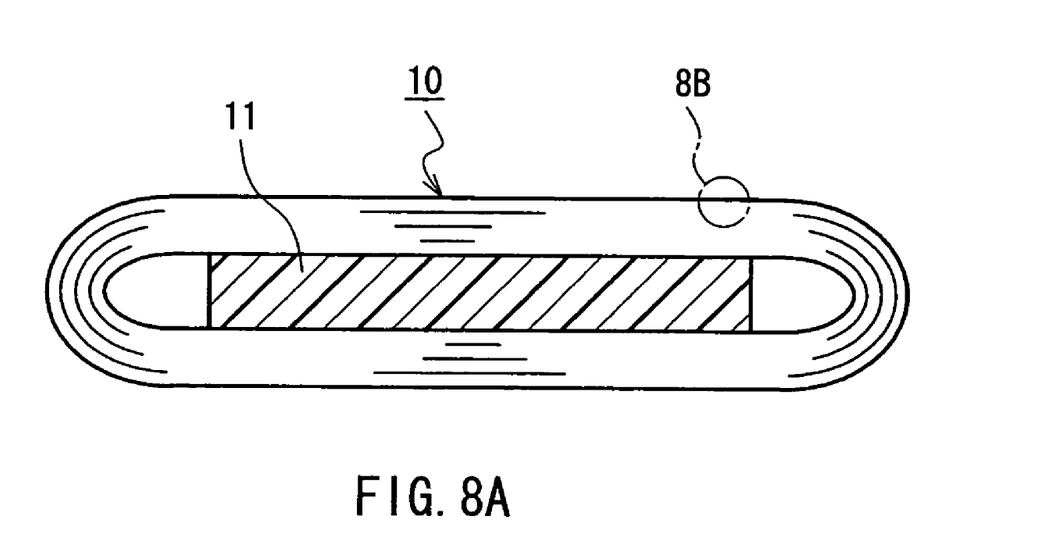
FIG. 8A is a cross-sectional view of an energy device according to a comparative example.
Figure 8B:
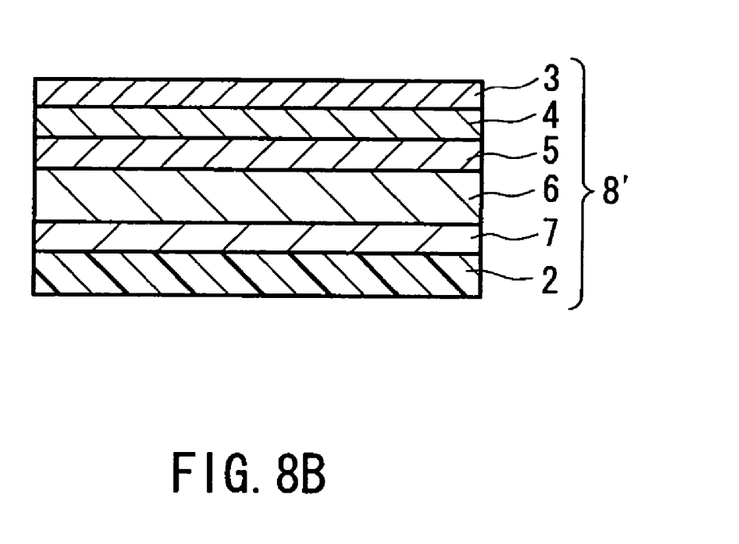
FIG. 8B is an enlarged cross-sectional view of a portion 8B in FIG. 8A.

The energy devices shown in FIGS. 8A and 8B were produced. In these energy devices, a band-shaped laminate 8', in which a positive collector 7, a positive active material 6, a solid electrolyte 5, a negative active material 4, and a negative collector 3 are formed in this order on a flexible elongated substrate 2, is wound in a plate shape so that the substrate 2 is placed inside.

The energy devices of Comparative Examples 1 to 5 are the same as those of Examples 1 to 5, except that the order of forming thin films on the flexible substrate 2 is opposite. In the same way as in Examples 1 to 5, energy devices were obtained by varying the thickness of an inner core during pressing in the following five values: 0 µm (without an inner core), 10 µm, 40 µm, 1300 µm, and 3000 µm (assumed to be Comparative Examples 1, 2, 3, 4, and 5 in this order).

[Evaluation 1]

The energy devices of Examples 1 to 5 and Comparative Examples 1 to 5 were checked for a short-circuit occurrence ratio by the following method.

Each energy device was subjected to a charging/discharging test at a rate of 0.5 C (charged for two hours and discharged for two hours with respect to a total energy capacity), and a short-circuit occurrence ratio was checked before the charging/discharging test and after 10 cycles of the charging/discharging test. Table 1 shows the results.

TABLE 1

| Sample No. | | 1 | 2 | 3 | 4 | 5 |
|---|---|---|---|---|---|---|
| Inner core | Presence/Absence | Absence | Presence | Presence | Presence | Presence |
| | Thickness (µm) | — | 10 | 40 | 1300 | 3000 |
| Example | Before charging/discharging test | 9% | 5% | 2% | 1% | 1% |
| Comparative Example | Before charging/discharging test | 46% | 40% | 34% | 20% | 18% |
| Example | After charging/discharging test | 12% | 9% | 3% | 1% | 1% |
| Comparative Example | After charging/discharging test | 64% | 58% | 45% | 30% | 25% |

As is apparent from Table 1, the short-circuit occurrence ratio is lower in Examples 1 to 5 than in Comparative Examples 1 to 5. Furthermore, it is recognized that the short-circuit occurrence ratio is suppressed by using an inner core.

Examples 6-10

Energy devices described in Embodiment 1 of the present invention were produced by performing the vacuum film-forming method (FIG. 3) described in Embodiment 2 and thereafter, performing the winding step (FIG. 6) and the pressing step (FIG. 7) described in Embodiment 3.

Platinum (thickness: 0.2 µm) as a negative collector 3, silicon (thickness: 1 µm) as a negative active material 4, a lithium-phosphorus-oxygen material (thickness: 0.6 µm) as a solid electrolyte 5, lithium cobaltate (thickness: 3 µm) as a positive active material 6, and platinum (thickness: 0.2 µm) as a positive collector 7 were formed to thin films successively by vapor deposition on a polyethylene terephthalate film (thickness: 20 µm) as a flexible elongated substrate 2, whereby a band-shaped laminate 8 was obtained. By performing vapor deposition via a pattern mask provided with predetermined openings, the position and width of a stripe-shaped region with no thin film formed therein continuous in a longitudinal direction were set appropriately.

The band-shaped laminate 8 thus obtained was unwound, and then, was taken up around a winding body 62 in a substantially cylindrical shape so that the substrate 2 was placed inside, in a take-up apparatus 60 shown in FIG. 6.

Then, the winding body 62 in a substantially cylindrical shape was pressed with heating in a press apparatus 70 shown in FIG. 7 to obtain a plate-shaped winding body 10. The winding body 62 was subjected to pressure forming at 100° C. and 49.0 kPa under the condition that an inner core 11 in a plate shape was placed in a winding core portion of the winding body 62. A polyethylene terephthalate plate was used as the inner core 11, and its thickness was set to be in the following five values: 0 μm (without an inner core), 6 μm, 30 μm, 1000 μm, and 2000 μm (assumed to be Examples 6, 7, 8, 9, and 10 in this order).

External electrodes were formed at both ends of the plate-shaped winding body 10 thus obtained by thermal spraying of nickel.

Comparative Examples 6-10

Energy devices shown in FIGS. 8A and 8B were produced. In these energy devices, a band-shaped laminate 8', in which a positive collector 7, a positive active material 6, a solid electrolyte 5, a negative active material 4, and a negative collector 3 are formed in this order on a flexible elongated substrate 2, is wound in a plate shape so that the substrate 2 is placed inside.

The energy devices of Comparative Examples 6 to 10 are the same as those of Examples 6 to 10, except that the order of forming thin films on the flexible substrate 2 is opposite. In the same way as in Examples 6 to 10, energy devices were obtained by varying the thickness of an inner core during pressing in the following five values: 0 μm (without an inner core), 6 μm, 30 μm, 1000 μm, and 2000 μm (assumed to be Comparative Examples 6, 7, 8, 9, and 10 in this order).

[Evaluation 2]

The energy devices of Examples 6 to 10 and Comparative Examples 6 to 10 were checked for a short-circuit occurrence ratio by the following method.

Each energy device was subjected to a charging/discharging test at a rate of 1 C (charged for one hour and discharged for one hour with respect to a total energy capacity), and a short-circuit occurrence ratio was checked before the charging/discharging test and after 200 cycles of the charging/discharging test. Table 2 shows the results.

TABLE 2

| Sample No. | | 6 | 7 | 8 | 9 | 10 |
|---|---|---|---|---|---|---|
| Inner core | Presence/Absence | Absence | Presence | Presence | Presence | Presence |
| | Thickness (μm) | — | 6 | 30 | 1000 | 2000 |
| Example | Before charging/discharging test | 7% | 4% | 1% | 1% | 1% |
| Comparative Example | Before charging/discharging test | 32% | 28% | 24% | 10% | 9% |
| Example | After charging/discharging test | 14% | 10% | 3% | 2% | 1% |
| Comparative Example | After charging/discharging test | 65% | 52% | 43% | 33% | 28% |

As is apparent from Table 2, the short-circuit occurrence ratio is lower in Examples 6 to 10 than in Comparative Examples 6 to 10. Furthermore, it is recognized that a short-circuit occurrence ratio is suppressed by using an inner core.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An energy device comprising a winding body in which a band-shaped laminate having a flexible elongated substrate, a negative collector, a negative active material, a solid electrolyte, a positive active material, and a positive collector in this order is wound in a plate shape with the flexible elongated substrate placed inside, wherein a cross-sectional shape of the winding body perpendicular to a winding axis includes portions at opposing ends of the cross-sectional shape with small radiuses of curvature and portions between the opposing ends of the cross-sectional shape with large radiuses of curvature, wherein the flexible elongated substrate is made of an insulating material, wherein in the band-shaped laminate, adjacent layers of the flexible elongated substrate, the negative collector, the negative active material, the solid electrolyte, the positive active material, and the positive collector respectively are in direct contact with each other, and wherein the negative collector, the negative active material, the solid electrolyte, the positive active material, and the positive collector are formed on the flexible elongated substrate by a vacuum film-forming apparatus.

2. The energy device according to claim 1, wherein a thickness of the negative active material is smaller than that of the positive active material.

3. The energy device according to claim 1, wherein a minimum radius of an outer surface of the flexible elongated substrate is in a range of 5 times to 100 times a thickness of the band-shaped laminate excluding the flexible elongated substrate.

4. The energy device according to claim 1, wherein the ratio of the size in a horizontal direction to the size in a vertical direction for the plate shape is at least 5.

* * * * *